(12) United States Patent
Yang et al.

(10) Patent No.: US 8,200,154 B2
(45) Date of Patent: Jun. 12, 2012

(54) SYSTEM, APPARATUS AND METHOD TO CONTROL OUTPUT OF RADIO FREQUENCY SIGNAL

(75) Inventors: Chee-hwan Yang, Suwon-si (KR); Youne-sang Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 863 days.

(21) Appl. No.: 11/041,395

(22) Filed: Jan. 25, 2005

(65) Prior Publication Data

US 2005/0164635 A1    Jul. 28, 2005

(30) Foreign Application Priority Data

Jan. 28, 2004    (KR) .................. 10-2004-0005473

(51) Int. Cl.
*H04B 7/00* (2006.01)
(52) U.S. Cl. ............... 455/41.2; 455/550.1; 455/556.2; 370/338
(58) Field of Classification Search ............... 455/41.2, 455/420, 13.3, 113, 41.3, 90.3, 550.1, 552.1, 455/554, 556.1, 556.2; 370/506, 347, 338
See application file for complete search history.

(56) References Cited

U.S. PATENT DOCUMENTS

| 5,371,734 A * | 12/1994 | Fischer .................. 370/311 |
| 6,087,937 A * | 7/2000 | McCarthy .................. 340/567 |
| 6,345,043 B1 * | 2/2002 | Hsu .................. 370/324 |
| 6,347,375 B1 | 2/2002 | Reinert et al. |
| 6,496,703 B1 * | 12/2002 | da Silva .................. 455/456.4 |
| 6,795,418 B2 * | 9/2004 | Choi .................. 370/336 |
| 6,882,851 B2 * | 4/2005 | Sugar et al. .................. 455/454 |
| 7,142,877 B2 * | 11/2006 | Lipovski .................. 455/456.4 |
| 7,236,460 B2 * | 6/2007 | Wu et al. .................. 370/241 |
| 7,369,518 B2 * | 5/2008 | Lee .................. 370/311 |
| 7,433,702 B2 * | 10/2008 | Lindskog et al. .................. 455/522 |
| 2002/0061744 A1 * | 5/2002 | Hamalainen et al. .................. 455/426 |
| 2003/0124983 A1 * | 7/2003 | Parssinen et al. .................. 455/69 |
| 2003/0181213 A1 * | 9/2003 | Sugar et al. .................. 455/454 |
| 2004/0087318 A1 * | 5/2004 | Lipovski .................. 455/456.4 |
| 2004/0110530 A1 * | 6/2004 | Alone et al. .................. 455/552.1 |
| 2004/0137915 A1 * | 7/2004 | Diener et al. .................. 455/456.1 |
| 2004/0192284 A1 * | 9/2004 | Vaisanen et al. .................. 455/422.1 |

(Continued)

FOREIGN PATENT DOCUMENTS

KR    1998-20528    6/1998

(Continued)

OTHER PUBLICATIONS

Korean Office Action dated Sep. 12, 2007 issued in KR 2004-5473.

*Primary Examiner* — Nhan Le
(74) *Attorney, Agent, or Firm* — Stanzione & Kim, LLP

(57) ABSTRACT

A system, apparatus and method to control the output of a radio frequency signal in a wireless local area network (LAN) system having an infrastructure. The system includes an access point which periodically transmits a frame including output control information used to control the output of the radio frequency signal, and a wireless terminal apparatus including a wireless transceiver module which receives the frame and a control module which extracts the output control information from the received frame, and controls the output of the radio frequency signal by the wireless transceiver module according to the extracted output control information.

12 Claims, 9 Drawing Sheets

Output monitoring/controlling apparatus(300)

Wireless transceiver module (320)

Wireless terminal apparatus (310)

U.S. PATENT DOCUMENTS

| | | | |
|---|---|---|---|
| 2005/0073389 A1* | 4/2005 | Chandley | 340/5.31 |
| 2005/0099978 A1* | 5/2005 | Chandra et al. | 370/338 |
| 2005/0143123 A1* | 6/2005 | Black et al. | 455/552.1 |
| 2005/0227723 A1* | 10/2005 | Lee et al. | 455/522 |
| 2005/0277426 A1* | 12/2005 | Evans et al. | 455/456.1 |
| 2006/0120336 A1* | 6/2006 | Fantaske | 370/338 |

FOREIGN PATENT DOCUMENTS

| | | |
|---|---|---|
| KR | 1999-65151 | 8/1999 |
| KR | 2001-92079 A | 10/2001 |
| KR | 2003-71502 | 9/2003 |
| WO | WO 01/61441 A1 * | 8/2001 |
| WO | WO01/61441 A1 | 8/2001 |

* cited by examiner

SYSTEM, APPARATUS AND METHOD TO CONTROL OUTPUT OF RADIO FREQUENCY SIGNAL

CROSS-REFERENCE TO RELATED APPLICATIONS

This application claims the priority of Korean Patent Application No. 10-2004-5473 filed on Jan. 28, 2004 in the Korean Intellectual Property Office, the disclosure of which is incorporated herein in its entirety and by reference.

BACKGROUND OF THE INVENTION

1. Field of the Invention

The present general inventive concept relates to a system, apparatus and method to control the output of a radio frequency (RF) signal, and more particularly, to a system, apparatus and method to automatically control the output of an RF signal according to local characteristics by establishing a particular field of a frame for wireless communication as information to control the output of the RF signal.

2. Description of the Related Art

Wireless terminal apparatuses complying with a wireless local area network (LAN) standard such as the Institute of Electrical and Electronic Engineers (IEEE) 802.11 standard usually use an RF signal in the 2.4 or 5 GHz band. When using wireless terminal apparatuses, users need to be cautious since such RF signals cause errors in other electronic machines. In particular, use of wireless terminal apparatuses should be restricted in places such as airplanes, hospitals, and laboratories. US Federal Aviation Administration recommends the installation of an ON/OFF button for controlling the output of an RF signal to wireless terminal apparatuses complying with the wireless LAN standard, so that a user can control RF transmission and reception by directly operating the ON/OFF button in places where output of RF signals is restricted.

Figure 1A:
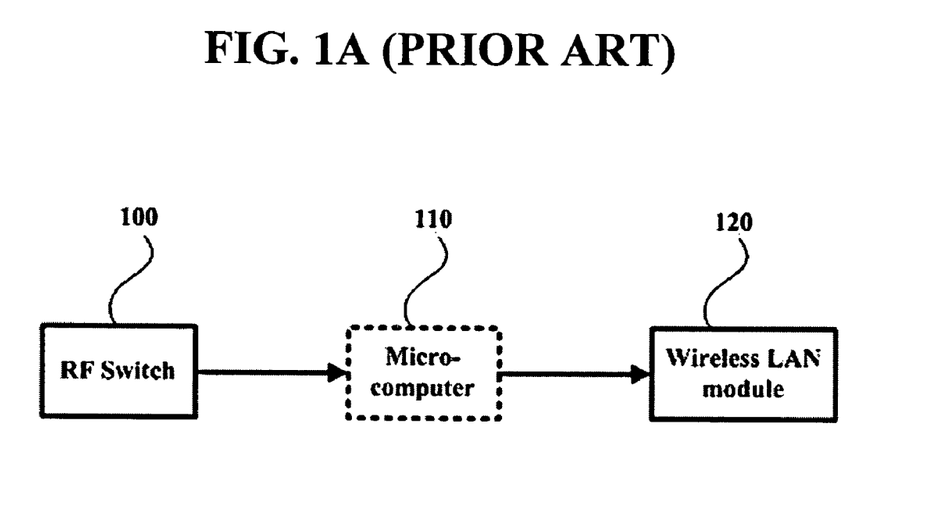
FIG. 1A illustrates a conventional hardware structure for controlling the output of a radio frequency (RF) signal.

FIG. 1A illustrates a conventional hardware structure for controlling the output of an RF signal. A wireless terminal apparatus includes an RF switch 100 which controls the output of an RF signal and a wireless LAN module 120 which transmits and receives RF signals. In other words, a user inputs an ON or OFF signal using the RF switch 100 that can be directly operated by the user, and then the ON or OFF signal connects to a particular pin of the wireless LAN module 120 and directly controls the output of an RF signal. Alternatively, a microcomputer 110 may receive a signal for controlling output of RF signals from the RF switch 100 and control the wireless LAN module 120. For example, when a function key of a notebook computer is used, the microcomputer 110 may sense a user's input and control the output of an RF signal generated by the wireless LAN module 120 using an interface such as a General Purpose Interface Bus (GPIB).

Figure 1B:
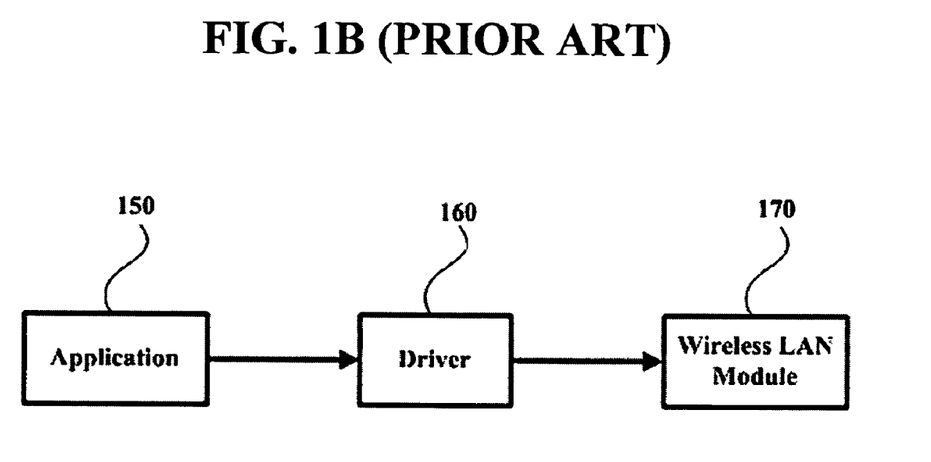
FIG. 1B illustrates a conventional software structure for controlling the output of an RF signal.

FIG. 1B illustrates a conventional software structure for controlling the output of an RF signal. If a user sets a value in an application 150, which provides a function that controls the output of an RF signal, enabling the output of an RF signal to be controlled, a driver 160 controlling a wireless LAN module 170 controls the output of an RF signal by the wireless LAN module 170 using the value.

Figure 2A:
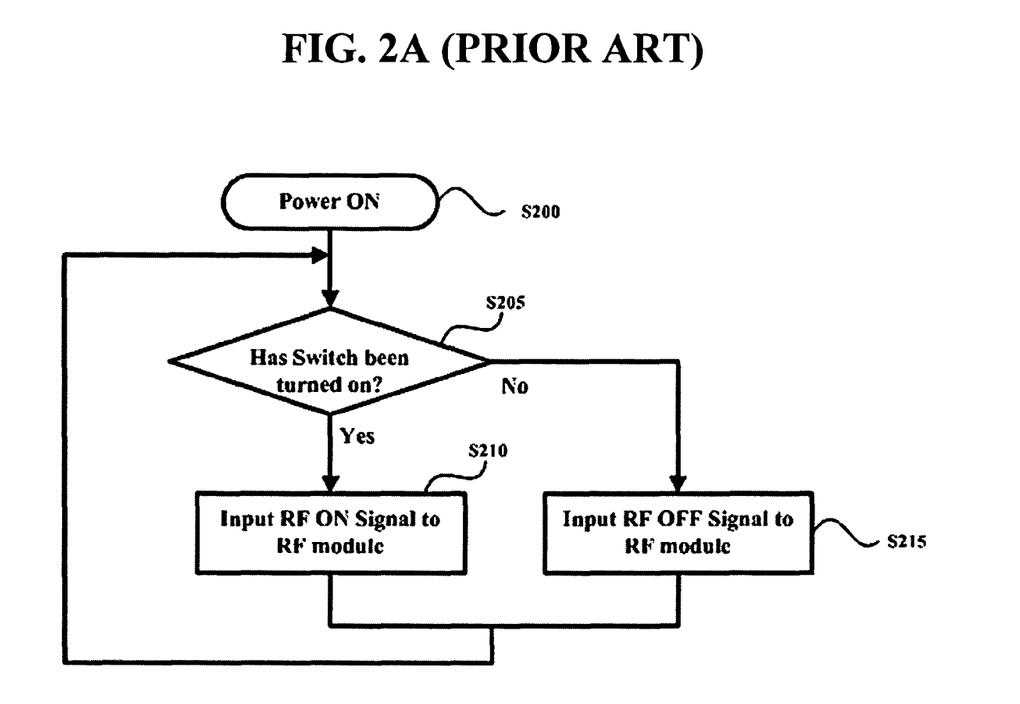
FIG. 2A is a flowchart of a conventional method of controlling the output of an RF signal in a hardware manner.

FIG. 2A is a flowchart of a conventional method of controlling the output of an RF signal in a hardware manner.

After turning on the power of a wireless terminal apparatus in step S200, if a user sets a switch for controlling the output of an RF signal in the on position in step S205, an RF-on signal for permitting the output of an RF signal is transmitted to an RF module in step S210. However, if the user sets the switch in the off position, an RF-off signal for interrupting the output of an RF signal is transmitted to the RF module in step S215.

Figure 2B:
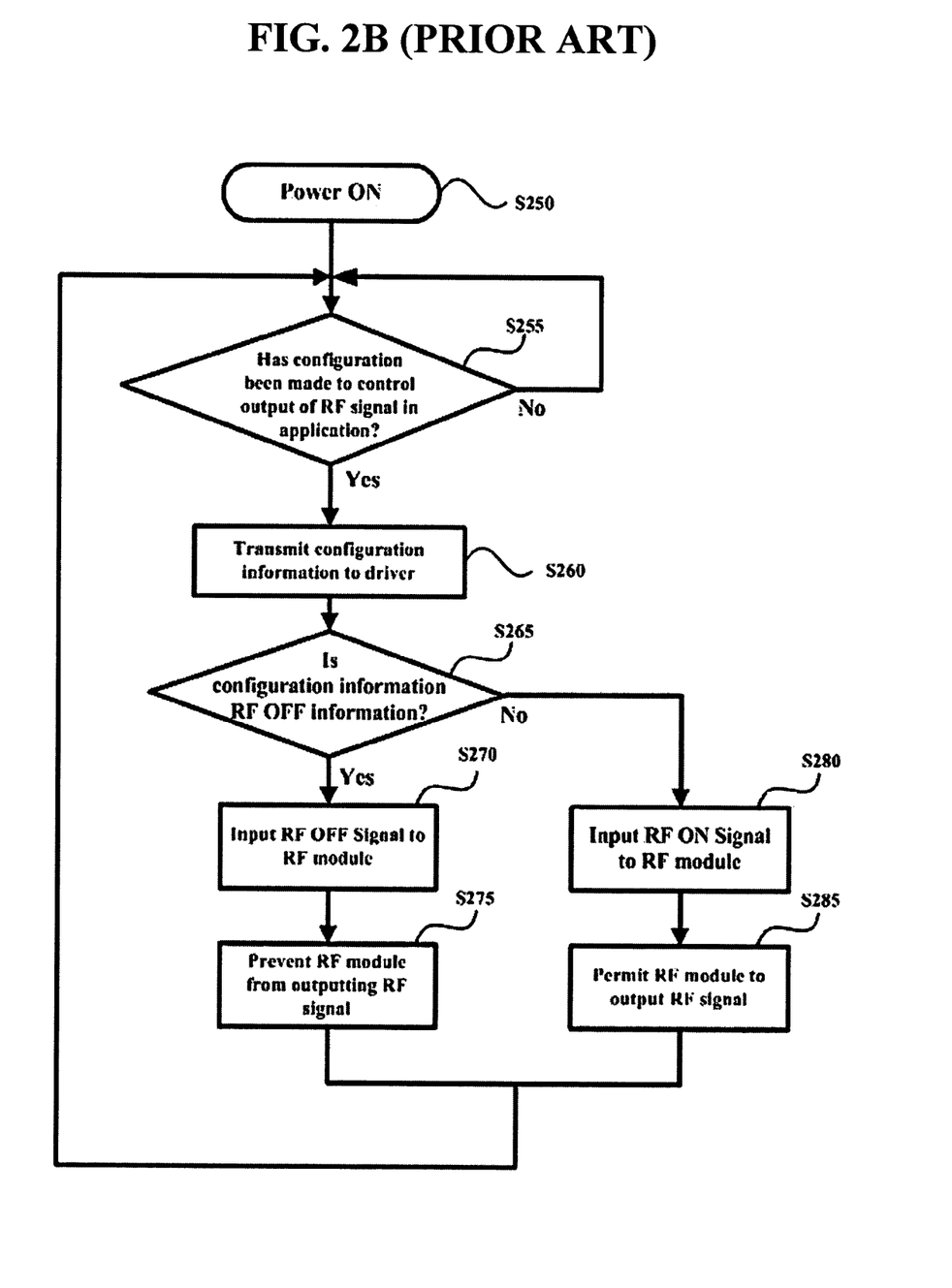
FIG. 2B is a flowchart of a conventional method of controlling the output of an RF signal in a software manner.

FIG. 2B is a flowchart of a conventional method of controlling the output of an RF signal in a software manner.

After turning on the power of a wireless terminal apparatus in step S250, if a user makes configuration changes in an application which can control the output of an RF signal to control the output of an RF signal in step S255, configuration information is transmitted to a driver which controls an RF module in step S260. If the configuration information permits the output of an RF signal in step S265, an RF signal is allowed to be output by the RF module in steps S280 and S285. However, if the configuration information interrupts the output of an RF signal in S265, the output of an RF signal is interrupted by the RF module in steps S270 and S275.

However, when a user is not cautious or is inexperienced at operating a wireless terminal apparatus, or when the above-described recommendation is not followed, there still remains a risk that an RF signal may be output and have an affect in places where the output of an RF signal is restricted. Moreover, since the user needs to personally control the output of an RF signal, the user may feel inconvenienced.

Therefore, it is desirable that under a predetermined condition, the output of an RF signal, which is generated by a wireless terminal apparatus, be automatically controlled without a user's personal operation or intervention.

SUMMARY OF THE INVENTION

The present general inventive concept provides system, apparatus and method to automatically control the output of a radio frequency (RF) signal by using a particular field of a frame complying with a predetermined wireless communication standard as a field to control the output of the RF signal, thereby making it easier to use a wireless terminal apparatus.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a system to control an output of a radio frequency signal in a wireless local area network (LAN) environment having an infrastructure. The system includes an access point which periodically transmits a frame including output control information used to control the output of the radio frequency signal, a wireless terminal apparatus including a wireless transceiver module which receives the frame and a control module which extracts the output control information from the received frame and controls the output of the radio frequency signal by the wireless transceiver module according to the extracted output control information.

The foregoing and/or other aspects and advantages of the present general inventive concept area also achieved by providing an apparatus to control the output of an RF signal in a wireless local area network (LAN) system having an infrastructure. The apparatus includes a wireless transceiver module which periodically receives a frame including output control information on the output of an RF signal from an access point, a control module which controls the output of an RF signal by the wireless transceiver module according to the output control information, and a display module which displays the output control information to a user.

The output control information may comprise information to disable the output of a radio frequency signal by the wireless transceiver module or information to enable the output of a radio frequency signal by the wireless transceiver module. Also, the output control information may comprise information on the access point.

The frame may comprise a beacon frame complying with an Institute of Electrical and Electronic Engineers (IEEE) 802.11 standard.

The display module can display a result of the operation performed by the control module to the user.

The foregoing and/or other aspects and advantages of the present general inventive concept are also achieved by providing a method of controlling the output of an RF signal in a wireless LAN system having an infrastructure. In this method, a wireless terminal apparatus receives a frame including output control information on the output of an RF signal from an access point. The received output control information is extracted from the frame, and the output of an RF signal by the wireless terminal apparatus is controlled according to the extracted output control information.

Preferably, the output control information is information to disable the output of a radio frequency signal by the wireless terminal apparatus or information to enable the output of a radio frequency signal by the wireless terminal apparatus. Here, when the output control information is information to disable the output of a radio frequency signal by the wireless terminal apparatus, it is displayed to the user.

Also, the output control information is information on the access point.

The frame may comprise a beacon frame complying with an Institute of Electrical and Electronic Engineers (IEEE) 802.11 standard.

The foregoing and/or other aspects and advantages of the present general inventive concept are also achieved by providing a method of controlling the output of an RF signal in a wireless LAN system having an infrastructure. In this method, an access point senses a radio frequency signal in a predetermined frequency band. Next, when the radio frequency signal in a predetermined frequency band is sensed, the access point transmits predetermined event information to a network connected thereto.

The predetermined event information can be information to generate warning messages or information to broadcast warning messages.

The predetermined frequency band may comprise a frequency band assigned to a wireless LAN complying with an Institute of Electrical and Electronic Engineers (IEEE) 802.11 standard.

The transmitting of the predetermined event information may comprise transmitting a frame containing output control information on the output of a radio frequency signal. Here, the output control information may be information to disable the output of a radio frequency signal by the wireless transceiver module or information to enable the output of a radio frequency signal by the wireless transceiver module. The output control information may also comprise information on the access point.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

The present general inventive concept will now be described more fully with reference to the accompanying drawings, in which various embodiments of the general inventive concept are shown. This invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the same reference numerals represent the same elements.

Figure 3:
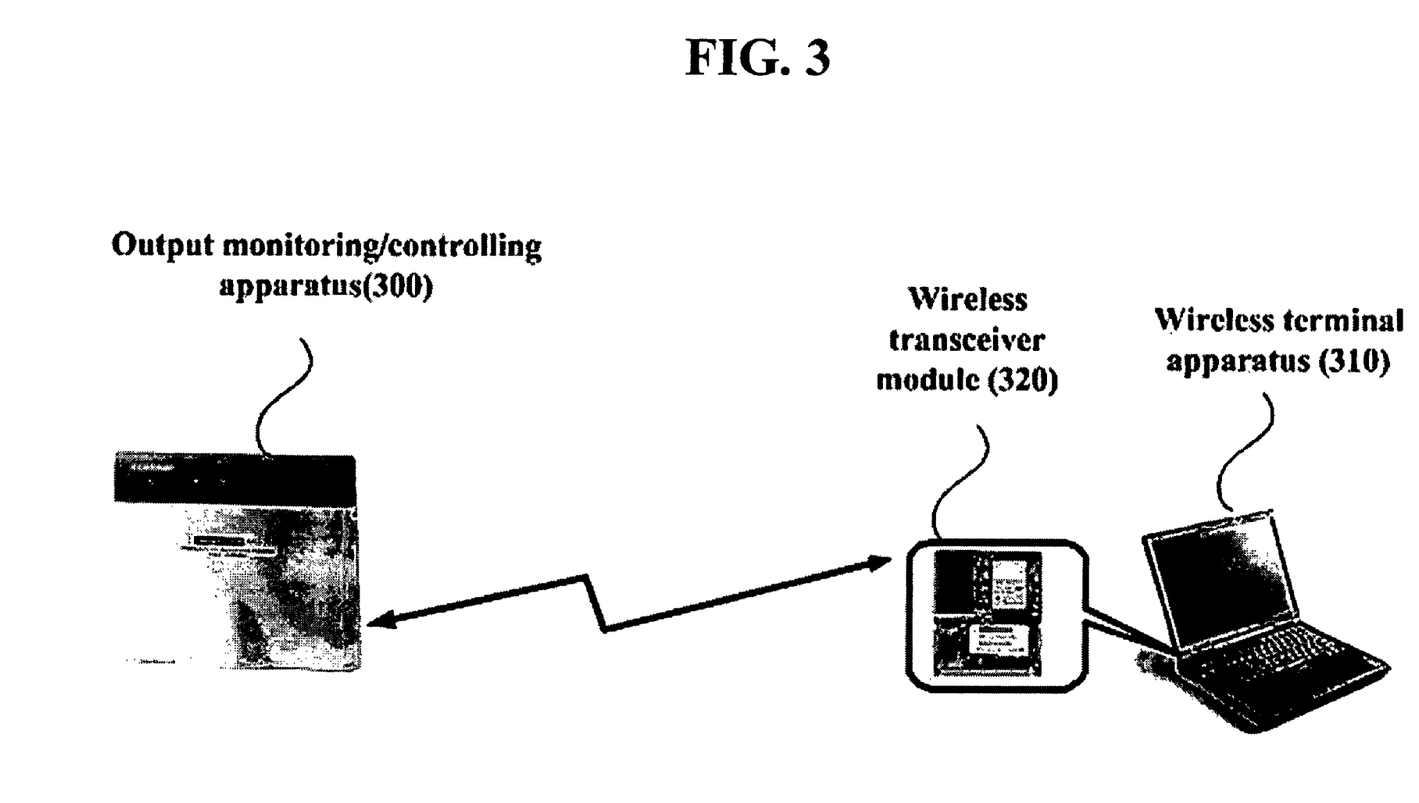
FIG. 3 illustrates a system to control the output of an RF signal according to an embodiment of the present general inventive concept.

FIG. 3 illustrates a system to control the output of a radio frequency (RF) signal according to an embodiment of the present general inventive concept. The system includes a wireless transceiver module 320, at least one wireless terminal apparatus 310 in which the wireless transceiver module 320 may be installed, and an output monitoring/controlling apparatus 300.

The wireless transceiver module 320 is a wireless interface module complying with a predetermined wireless communication standard and it functions as a communication interface between the output monitoring/controlling apparatus 300 and the wireless terminal apparatus 310.

The wireless terminal apparatus 310 includes the wireless transceiver module 320 or an external port to which the wireless transceiver module 320 can be connected. The wireless terminal apparatus 310 may be a mobile information processing apparatus such as a notebook computer or a personal digital assistant (PDA).

The output monitoring/controlling apparatus 300 can communicate with the wireless terminal apparatus 310 and the wireless transceiver module 320, and it monitors and controls the output of RF signals generated by a plurality of wireless terminal apparatuses in a predetermined area.

In the present general inventive concept, the output monitoring/controlling apparatus 300 may operate in either a transmission mode or a reception mode. In the transmission mode, the output monitoring/controlling apparatus 300 periodically transmits output control information to interrupt the output of an RF signal to the wireless terminal apparatus 310 that the output monitoring/controlling apparatus 300 can communicate with, thereby compelling the wireless terminal apparatus 310 not to output an RF signal. In the reception mode, when an RF signal in a predetermined frequency band is sensed in a coverage area of the output monitoring/controlling apparatus 300, the output monitoring/controlling apparatus 300 informs an administrator administering the coverage area or an operator operating the output monitoring/controlling apparatus 300 that the output of an RF signal has been sensed, or transmits the output control information, as in the transmission mode. The transmission mode and the reception mode may be exclusively configured by the operator of the output monitoring/controlling apparatus 300, and the output monitoring/controlling apparatus 300 may provide a function that enables or disables the mode configuration.

Figure 4:
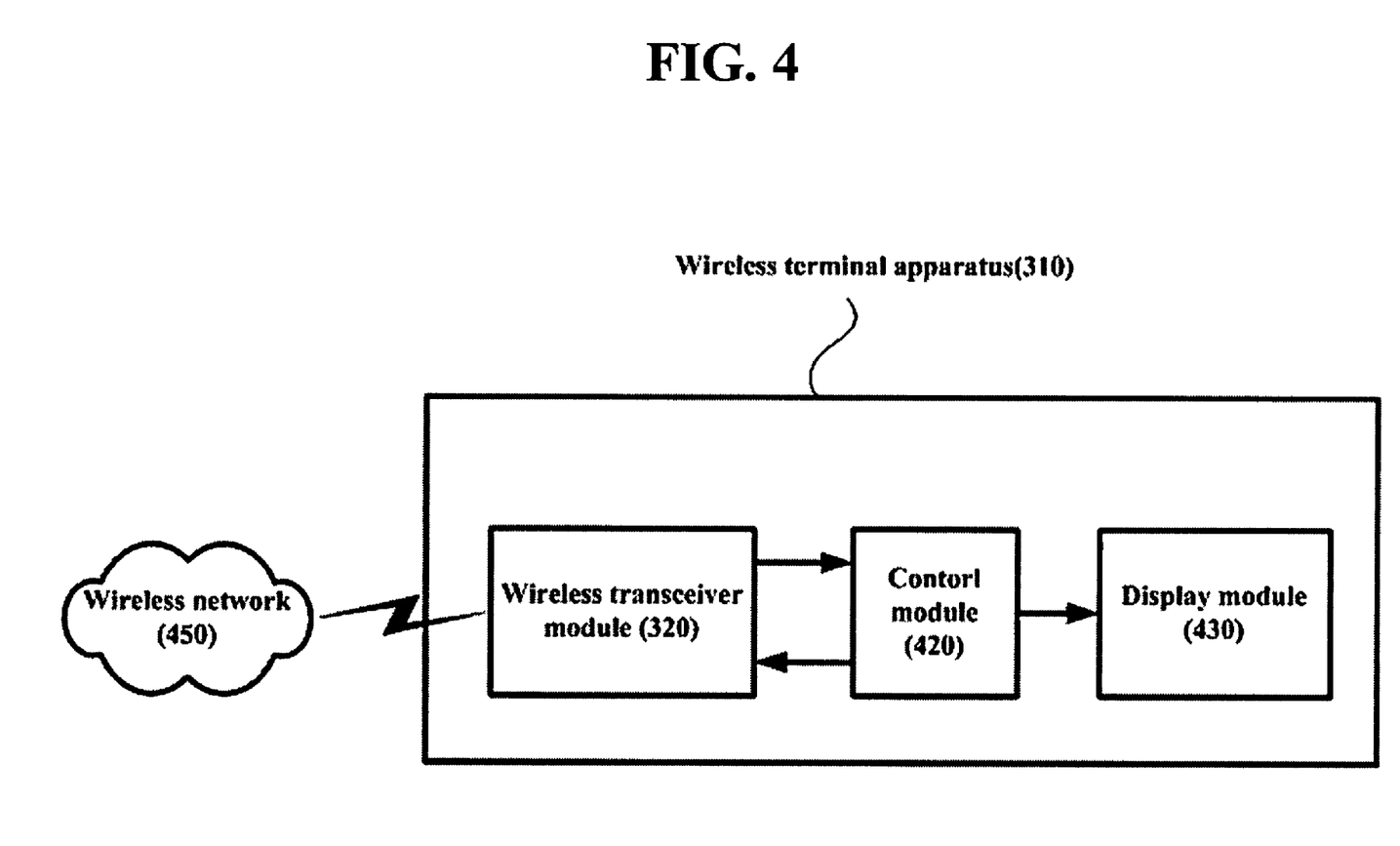
FIG. 4 is a block diagram of a wireless terminal apparatus to control the output of an RF signal according to an embodiment of the present general inventive concept.

FIG. 4 is a block diagram of a wireless terminal apparatus to control the output of an RF signal according to an embodiment of the present general inventive concept. The wireless terminal apparatus 310 includes the wireless transceiver module 320, a control module 420, and a display module 430. The wireless transceiver module 320 periodically receives a frame, including the output control information on output of an RF signal by the wireless terminal apparatus 310, from the output monitoring/controlling apparatus 300 through a wireless network 450. Next, the control module 420 controls the output of an RF signal by the wireless transceiver module 320 according to the output control information. The display module 430 displays the output control information to a user.

Hereinafter, for clarity of description, it is assumed that a wireless system complies with the IEEE 802.11 wireless local area network (LAN) standard. Accordingly, the output monitoring/controlling apparatus 300 corresponds to an access point in a wireless LAN system, and the wireless terminal apparatus 310 corresponds to a station defined by the IEEE 802.11 standard. The wireless transceiver module 320 may be a wireless LAN module such as a wireless LAN card supporting the IEEE 802.11 standard.

In an embodiment of the present general inventive concept, the access point may operate in the transmission mode and interrupt the output of an RF signal generated by the station using a beacon frame defined by the IEEE 802.11 standard, and it may also operate in the reception mode and sense an RF signal in a predetermined frequency band defined by the IEEE 802.11 standard.

Figure 5A:
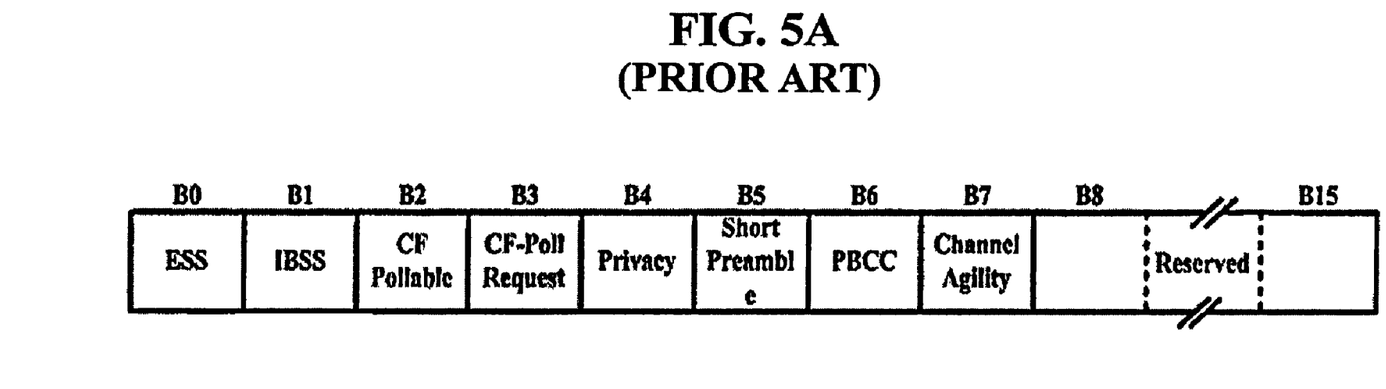
FIG. 5A illustrates a conventional structure of capability information of a beacon frame.

FIG. 5A illustrates a conventional structure of capability information of a beacon frame. The capability information is two bytes in length. Bits B0 through B7 are defined by the IEEE 802.11 standard, and bits B8 through B15 are reserved for future usage.

Figure 5B:
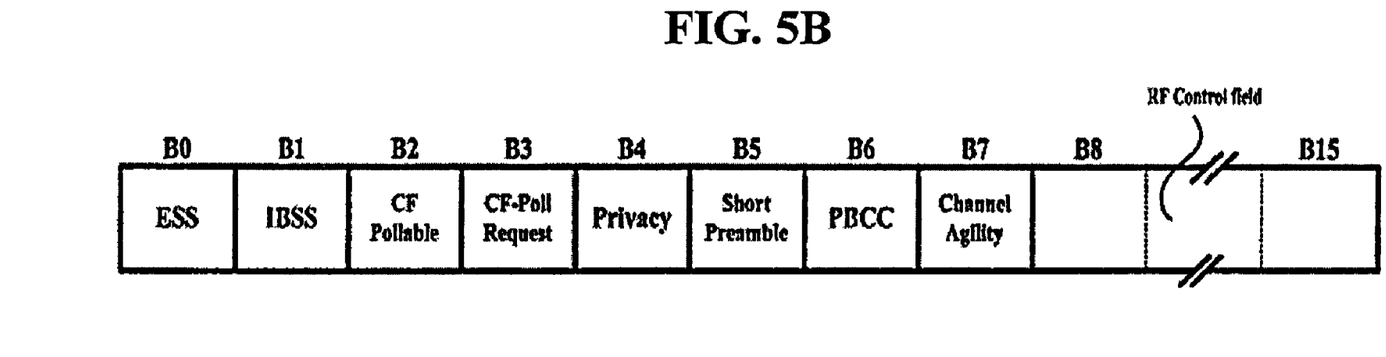
FIG. 5B illustrates a structure of capability information of a beacon frame according to an embodiment of the present general inventive concept.

FIG. 5B illustrates a structure of capability information of a beacon frame according to an embodiment of the present general inventive concept. In the present general inventive concept, bits B8 through B15 of the capability information in the beacon frame are set as an RF control field.

Figure 5C:
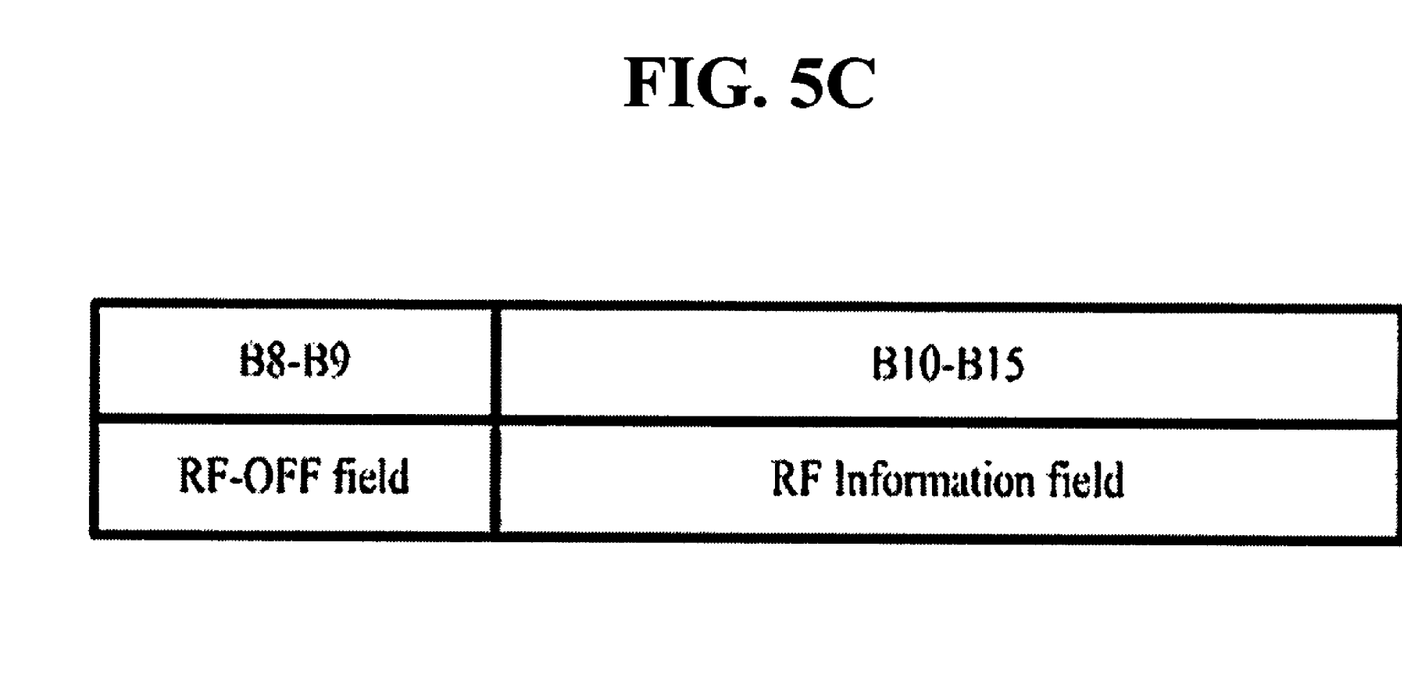
FIG. 5C illustrates a structure of an RF control field according to an embodiment of the present general inventive concept.

FIG. 5C illustrates a structure of an RF control field according to an embodiment of the present general inventive concept. As shown in FIG. 5C, the RF control field may include an RF-off field enabling or disabling the output of an RF signal by the station and an RF information field including information on an access point. For example, when the RF-off field is set to "11", a station is not allowed to output an RF signal. When the RF-off field is set to "10", "10", or "00", the station is allowed to output an RF signal. In addition, the RF information field may include information about an installation company or an installation place that has right of management to the access point.

Figure 6:
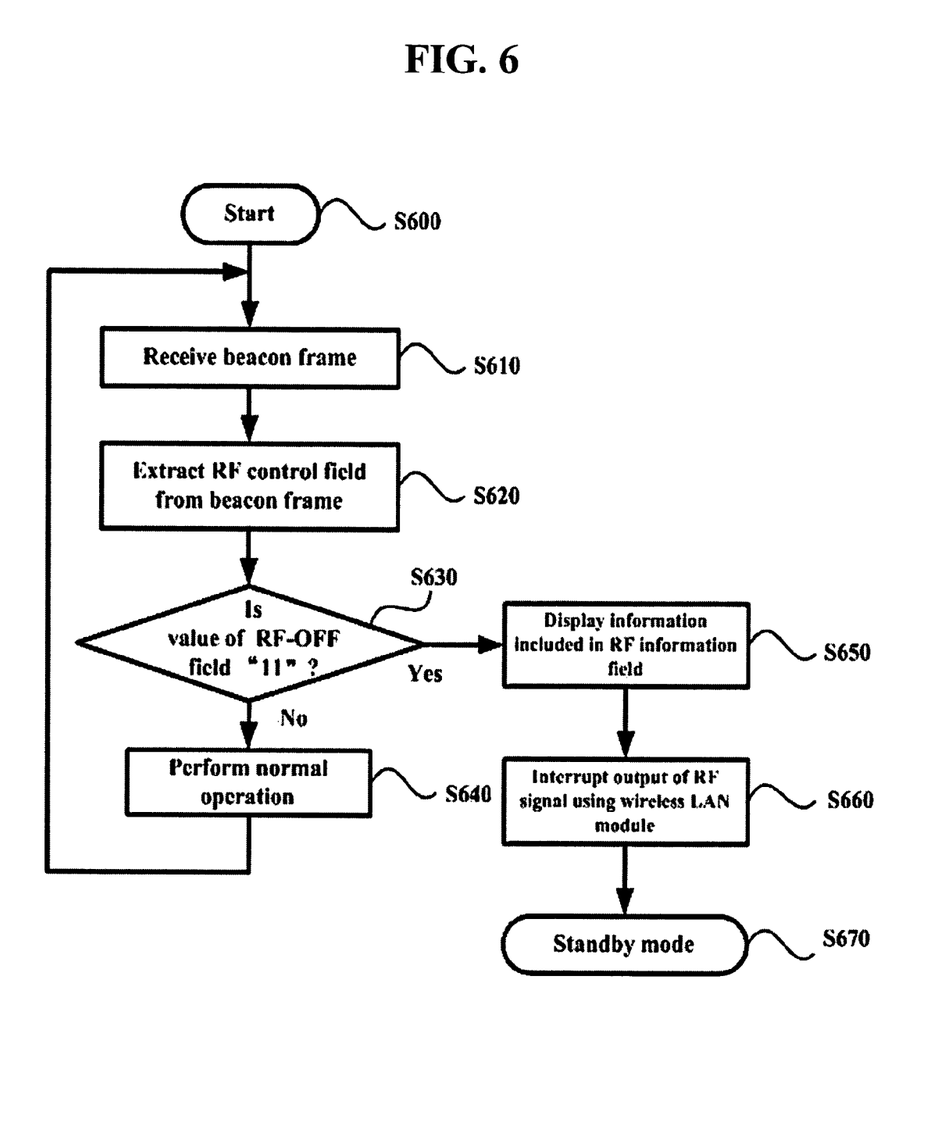
FIG. 6 is a flowchart of a method of controlling the output of an RF signal in a transmission mode according to an embodiment of the present general inventive concept.

FIG. 6 is a flowchart of a method of controlling the output of an RF signal in a transmission mode according to an embodiment of the present general inventive concept. The access point periodically transmits a beacon frame including capability information having a structure shown in FIG. 5B, to an adjacent station in operation S600. The station receives the beacon frame in operation S610 and extracts an RF control field shown in FIG. 5C from the beacon frame in operation S620. Operations S610 and S620 may be implemented in a single hardware module or in separate hardware modules, respectively. When operations S610 and S620 are implemented in a separate hardware module, operation S610 may be performed by a wireless LAN module, and operation S620 may be performed by a control module included in the station.

When a value of an RF-off field of the RF control field is "11" in operation S630, the station provides information included in an RF information field of the RF control field to a user by displaying the information on a display screen in operation S650, so that the user can recognize that output of an RF signal is restricted in a current area where the station is located. Thereafter, the station controls its wireless LAN module to interrupt the output of an RF signal in operation S660. The order in which operations S630 and S650 are performed may be changed as other embodiments of the present general inventive concept. As a result, the station cannot use a wireless LAN and remains in a standby mode until functions of the wireless LAN module are activated by, for example, the user turning on a power switch of the station in operation S670. Here, it is apparent that the station can perform operations that aren't among operations requiring use of a network.

Meanwhile, when the value of the RF-off field is not "11" in operation S630, the station can normally use the wireless LAN in operation S640.

Figure 7:
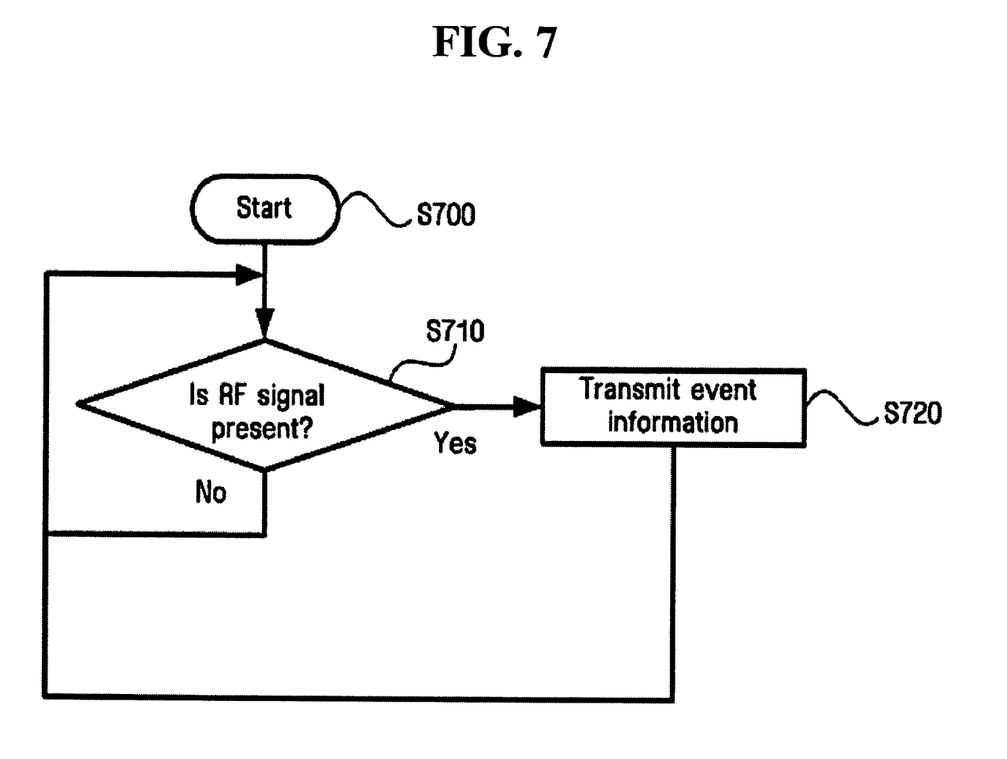
FIG. 7 is a flowchart of a method of controlling the output of an RF signal in a reception mode according to an embodiment of the present general inventive concept.

FIG. 7 is a flowchart of a method of controlling the output of an RF signal in a reception mode according to an embodiment of the present general inventive concept. In the reception mode, an access point does not transmit a beacon frame but monitors whether an RF signal in a predetermined frequency band is present in an area managed by the access point, in operation S710. When the RF signal is sensed, the access point transmits alarm information or warning message information to a network connected thereto indicating that the RF signal in the predetermined frequency band has been sensed in operation S720. For example, if the RF signal in the predetermined frequency band is sensed in an airplane in the reception mode, the access point transmits the warning message information to a broadcast system in the airplane. Then, the broadcast system may broadcast a message requesting passengers not to use wireless terminal apparatuses in the airplane. Alternatively, when the RF signal in the predetermined frequency band is sensed, the access point may transmit a frame including information to control the output of an RF signal as in the transmission mode, thereby forcibly interrupting the output of an RF signal.

Having thus described certain embodiments of the present general inventive concept, various alterations, modifications and improvements will be apparent to those of ordinary skill in the art without departing from the spirit and scope of the present general inventive concept. Accordingly, the foregoing description and the accompanying drawings are not intended to be limiting.

The present general inventive concept provides the following and other effects.

Firstly, output of an RF signal can be automatically controlled without a user's operation, thereby preventing serious problems caused by electronic waves from occurring in places, such as the inside of a plane and hospitals, where the output of an RF signal is restricted.

Secondly, a user's operation is not required, thereby increasing the convenience of the user.

Thirdly, since a field defined by an existing wireless communication standard is used, the present general inventive concept can be easily implemented by changing only software or firmware and without having to add new hardware to a wireless terminal apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling an output of a radio frequency signal in a wireless local area network (LAN) environment having an infrastructure, comprising:
   allowing an access point to sense a radio frequency signal in a predetermined frequency band; and
   transmitting predetermined event information to a network connected to the access point when the radio frequency signal is sensed by transmitting a frame containing output control information on the output of a radio frequency signal,
   wherein the output control information comprises information used to disable the output of a radio frequency signal.

2. The method of claim 1, wherein the predetermined event information comprises information to generate warning messages.

3. The method of claim 1, wherein the predetermined event information comprises information to broadcast warning messages.

4. The method of claim 1, wherein the predetermined frequency band comprises a frequency band assigned to a wireless LAN complying with an Institute of Electrical and Electronic Engineers (IEEE) 802.11 standard.

5. The method of claim 1, wherein the output control information comprises information on the access point.

6. The method of claim 1, wherein the output control information further includes information used to enable the output of a radio frequency signal.

7. An apparatus to control wireless local area network radio frequency (RF) signals, comprising:
   an access point that operates in either a transmission mode or a reception mode to control output of and/or monitor the radio frequency signals transmitted by the wireless local area network, the access point comprising:
      a reception part to sense an RF signal in a predetermined frequency band in a predetermined coverage area and to inform an administrator of the coverage area of the sensed output RF signal; and
      a transmission part to periodically output control information to interrupt the output of the RF signal.

8. The apparatus of claim 7, wherein the transmission mode and the reception mode are exclusively configured by an operator of the access point, and the access point provides a function that enables and disables the mode configuration.

9. The apparatus of claim 7, wherein the wireless local area network is a wireless terminal apparatus comprising a wireless transceiver module, a control module and a display module.

10. The apparatus of claim 7, wherein the output control information is contained in an RF control field of a beacon frame.

11. A method of controlling wireless local area network radio frequency (RF) signals, comprising:
   sensing RF signals of a predetermined frequency band transmitted within a predetermined coverage area; and
   transmitting message information related to the sensed output RF signals to an administrator of the coverage area,
   wherein the message information includes information to generate and broadcast warning messages related to the predetermined frequency band of the sensed RF signals.

12. The method of claim 11, wherein the RF signals are sent from a wireless transceiver module of a wireless terminal apparatus.

* * * * *